(12) United States Patent
Xie (10) Patent No.: US 12,056,146 B2
(45) Date of Patent: Aug. 6, 2024

(54) DATA EXCHANGE METHOD AND APPARATUS, READABLE STORAGE MEDIUM, AND DATA EXCHANGE SYSTEM

(71) Applicant: BOE Technology Group Co., Ltd., Beijing (CN)

(72) Inventor: Yingkai Xie, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/418,224

(22) PCT Filed: Dec. 29, 2020

(86) PCT No.: PCT/CN2020/140798
§ 371 (c)(1),
(2) Date: Sep. 2, 2021

(87) PCT Pub. No.: WO2021/169574
PCT Pub. Date: Sep. 2, 2021

(65) Prior Publication Data
US 2024/0012831 A1    Jan. 11, 2024

(30) Foreign Application Priority Data
Feb. 24, 2020   (CN) .......................... 202010111045.1

(51) Int. Cl.
*G06F 16/25*     (2019.01)
*G06F 16/178*    (2019.01)
*G06F 16/2457*   (2019.01)

(52) U.S. Cl.
CPC ........ *G06F 16/258* (2019.01); *G06F 16/1794* (2019.01); *G06F 16/24573* (2019.01)

(58) Field of Classification Search
CPC ............. G06F 16/258; G06F 16/24573; G06F 16/1794
See application file for complete search history.

(56) References Cited

U.S. PATENT DOCUMENTS 5,956,688 A * 9/1999 Kokubo ................. G06Q 99/00
                                                        705/7.29
9,372,803 B2   6/2016 Manne et al.
(Continued)

FOREIGN PATENT DOCUMENTS

CN    104156415 A    11/2014
CN    104462604 A     3/2015
(Continued)

OTHER PUBLICATIONS

CN202010111045.1 first office action.

*Primary Examiner* — Kris E Mackes
*Assistant Examiner* — Lin Lin M Htay
(74) *Attorney, Agent, or Firm* — IPro, PLLC (57) ABSTRACT

The disclosure relates to a data exchange method and apparatus, a readable storage medium, and a data exchange system. The method includes: determining whether each range in received data to be converted needs range conversion; in response to determining a range needs range conversion, acquiring a code and a name description of the range to be converted, and matching the code and the name description of the range to be converted with a preset matching rule; in response to a successful matching, performing range conversion on the range to be converted; in response to a failed matching, marking the range to be converted of which matching fails; and storing a converted range in a database, and storing a marked range in the database; and storing each range in the data to be converted in the database, to complete a data exchange process.

18 Claims, 3 Drawing Sheets

(56) References Cited

U.S. PATENT DOCUMENTS

2015/0326820 A1* 11/2015 Landy ................. H04N 7/0117
                                                                 348/445
2019/0385014 A1* 12/2019 Malak ................. G06F 16/3338
2020/0334024 A1* 10/2020 Gass ........................ G06F 8/40

FOREIGN PATENT DOCUMENTS

| CN | 107357792 A | 11/2017 |
| CN | 110196834 A | 9/2019 |
| CN | 110246592 A | 9/2019 |
| CN | 110263016 A | 9/2019 |
| CN | 111339174 A | 6/2020 |

* cited by examiner

DATA EXCHANGE METHOD AND APPARATUS, READABLE STORAGE MEDIUM, AND DATA EXCHANGE SYSTEM

CROSS REFERENCE TO RELATED APPLICATIONS

The present application is a national phase entry under 35 U.S.C. § 371 of International Application No. PCT/CN2020/140798, filed on Dec. 29, 2020, which claims priority to Chinese Patent Application No. 202010111045.1, filed to the China Patent Office on Feb. 24, 2020, the entire contents of which are incorporated herein by reference.

FIELD

The disclosure relates to the field of data exchange technology, in particular to a data exchange method and apparatus, a readable storage medium, and a data exchange system.

BACKGROUND

With continuous development of information technology, a large amount of precipitated data has been formed in various applications. To effectively utilize relevant data scattered in the applications, many data exchange systems for collecting such data have emerged.

However, as various applications were developed for different purposes at different time, and follow different data standards, a data exchange process needs conversion based on a unified standard. Therefore, a data exchange system provides a standard range set, and a source data range set needs to be aligned with the standard range set one by one so that data exchange can be carried out, and once unmatched mapping occurs during the data exchange, the interactive process will be directly interrupted, resulting in a data exchange failure.

SUMMARY

Embodiments of the disclosure provide a data exchange method and apparatus, a readable storage medium, and a data exchange system.

An embodiment of the disclosure provides a data exchange method, including:
  determining whether each range in received data to be converted needs range conversion;
  in response to determining a range needs range conversion, acquiring a code and a name description of the range to be converted, and matching the code and the name description of the range to be converted with a preset matching rule;
  in response to a successful matching, performing range conversion on the range to be converted;
  in response to a failed matching, marking the range to be converted of which matching fails; and
  storing a converted range in a database, and storing a marked range in the database; and storing each range in the data to be converted in the database, to complete a data exchange process.

In some embodiments, in the embodiment of the disclosure, if the matching between the code and the name description of the range to be converted and the preset matching rule fails, the method further includes:
  triggering a matching task, the matching task being used to provide a task processing interface and receive a feedback result of manual matching; and
  after the feedback result of the matching task is received, obtaining a set mapping rule according to the feedback result of the matching task, and storing the set mapping rule in the preset matching rule.

In some embodiments, in the embodiment of the disclosure, the method further includes: removing a mark on the marked range after receiving the feedback result of the matching task.

In some embodiments, in the embodiment of the disclosure, matching the code and the name description of the range to be converted with a preset matching rule includes:
  searching in the preset matching rule, for a rule consistent with a mapping relationship between the code and the name description of the range to be converted;
  in response to finding the rule consistent with the mapping relationship between the code and the name description of the range to be converted, determining that the matching is successful; and
  in response to that no rule consistent with the mapping relationship between the code and the name description of the range to be converted is found, searching in the preset matching rule, for a rule consistent with the mapping relationship of the name description of the range to be converted;
  in response to finding the rule consistent with the mapping relationship of the name description of the range to be converted, determining that the matching is successful; and
  in response to that no rule consistent with the mapping relationship of the name description of the range to be converted is found, determining that the matching fails.

In some embodiments, in the embodiment of the disclosure, matching the code and the name description of the range to be converted with a preset matching rule includes:
  matching the code and the name description of the range to be converted in the order of a general standard mapping rule, a custom mapping rule, an attribute mapping rule, and a set mapping rule successively.

In some embodiments, in the embodiment of the disclosure, the method further includes: if there is a range that does not need to be converted in the data to be converted, directly storing the range that does not need to be converted in the database.

In some embodiments, in the embodiment of the disclosure, the method further includes: providing a modification interface; and modifying the preset matching rule according to received rule modification information.

Correspondingly, an embodiment of the disclosure further provides a data exchange apparatus, including:
  a determination module configured to determine whether each range in received data to be converted needs range conversion;
  a matching module configured to, in response to determining a range needs range conversion, acquire a code and a name description of the range to be converted, and match the code and the name description of the range to be converted with a preset matching rule;
  a range conversion module configured to, in response to a successful matching, perform range conversion on the range to be converted;
  a marking module configured to, in response to a failed matching, mark the range to be converted of which matching fails; and a loading module configured to store a converted range in a database, and store a marked range in the database; and store each range in the data to be converted in the database, to complete a data exchange process.

In some embodiments, in the embodiment of the disclosure, the apparatus further includes a task processing module configured to trigger a matching task if the matching between the code and the name description of the range to be converted and the preset matching rule fails, the matching task being used to provide a task processing interface and receive a feedback result of manual matching; and after the feedback result of the matching task is received, obtain a set mapping rule according to the feedback result of the matching task, and store the set mapping rule in the preset matching rule.

In some embodiments, in the embodiment of the disclosure, the apparatus further includes a mark removal module configured to remove a mark on the marked range after receiving the feedback result of the matching task.

In some embodiments, in the embodiment of the disclosure, the matching module is specifically configured to:

search in the preset matching rule, for a rule consistent with a mapping relationship between the code and the name description of the range to be converted;

in response to finding the rule consistent with the mapping relationship between the code and the name description of the range to be converted, determine that the matching is successful;

and in response to that no rule consistent with the mapping relationship between the code and the name description of the range to be converted is found, search in the preset matching rule, for a rule consistent with the mapping relationship of the name description of the range to be converted;

in response to finding the rule consistent with the mapping relationship of the name description of the range to be converted, determine that the matching is successful; and in response to that no rule consistent with the mapping relationship of the name description of the range to be converted is found, determine that the matching fails.

In some embodiments, in the embodiment provided in the disclosure, the matching module is specifically configured to:

match the code and the name description of the range to be converted in the order of a general standard mapping rule, a custom mapping rule, an attribute mapping rule, and a set mapping rule successively.

In some embodiments, in the embodiment of the disclosure, the loading module is further configured to, if there is a range that does not need to be converted in the data to be converted, directly store the range that does not need to be converted in the database.

In some embodiments, in the embodiment of the disclosure, the apparatus further includes: a rule modification module configured to provide a modification interface; and modify the preset matching rule according to received rule modification information.

Correspondingly, an embodiment of the disclosure further provides a readable storage medium, which is configured to execute the above-mentioned data exchange method.

Correspondingly, an embodiment of the disclosure further provides a data exchange system, including:

a memory configured to store program instructions; and a processor configured to call the program instructions stored in the memory, and perform the following operations according to an obtained program:

determining whether each range in received data to be converted needs range conversion;

in response to determining a range needs range conversion, acquiring a code and a name description of the range to be converted, and matching the code and the name description of the range to be converted with a preset matching rule;

in response to a successful matching, performing range conversion on the range to be converted;

in response to a failed matching, marking the range to be converted of which matching fails; and storing a converted range in a database, and storing a marked range in the database; and storing each range in the data to be converted in the database, to complete a data exchange process.

DETAILED DESCRIPTION OF THE EMBODIMENTS

In some data exchange systems, a source data range set needs to be aligned with a standard range set one by one to allow data exchange. Using a system of National Health Commission collecting data from a hospital system as an example, for example, in the hospital system, in a range set of "gender", the numeral "1" represents male and "2" represents female, while in the system of National Health Commission, in a range set of "gender", the word "male" represents male and "female" represents female. The numeral "1" in the hospital system needs to be matched with the word "male" in the system of National Health Commission, and the numeral "2" in the hospital system needs to be matched with the word "female" in the system of National Health Commission, so that the range set of "gender" in the hospital system can be collected to the system of National Health Commission through data exchange. Once unmatched mapping occurs during the data exchange, the process will be interrupted. Still using the system of National Health Commission collecting data from the hospital system as an example, for example, if there is a range set of "medical cost" in the data to be converted in the hospital system, but no range set matched with the range set is found in the system of National Health Commission, then the data exchange process will be interrupted, resulting in a failure of the data exchange process.

Based on this, embodiments of the disclosure provide a data exchange method and apparatus, a readable storage medium, and a data exchange system.

Specific implementations of the data exchange method and apparatus, the readable storage medium, and the data exchange system provided in the embodiments of the disclosure are described in detail below in conjunction with the accompanying drawings. The size and shape of each part in the drawings do not reflect the true scale, and are merely intended to illustrate the disclosure.

Figure 1:
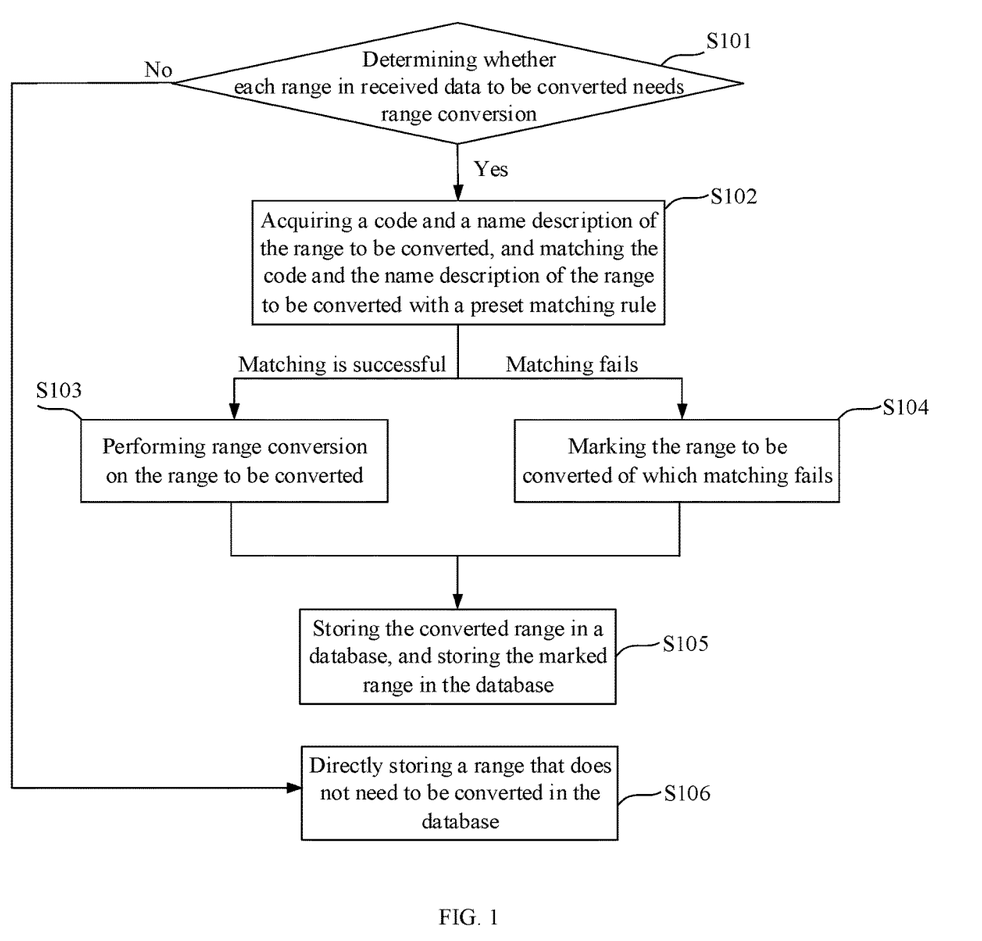
FIG. 1 illustrates a flow chart of a data exchange method in embodiments of the disclosure.

An embodiment of the disclosure provides a data exchange method, as shown in FIG. 1, including the following.

S101, determining whether each range in received data to be converted needs range conversion; if so, going to S102; and if not, going to S106.

S102, acquiring a code and a name description of the range to be converted, and matching the code and the name description of the range to be converted with a preset matching rule; if the matching is successful, going to S103; and if the matching fails, going to S104.

S103, performing range conversion on the range to be converted.

S104, marking the range to be converted of which the matching fails.

S105, storing the converted range in a database, and storing the marked range in the database; and storing each range in the data to be converted in the database, thus completing a data exchange process.

In the data exchange method provided in the embodiment of the disclosure, by matching the code and the name description of the range to be converted with the preset matching rule, the workload of alignment in an early-stage of data exchange is reduced, and as the range to be converted of which the matching fails is marked and then stored in the database, the problem of interruption in the data exchange process is avoided.

The data exchange method provided in the embodiment of the disclosure may be applied to various data exchange systems, such as the system of National Health Commission or the hospital system, and the data exchange system is used to collect relevant data in various applications. To more clearly describe the data exchange method in the embodiment of the disclosure, the system of National Health Commission collecting data from the hospital system is still used as an example for the description in the embodiment of the disclosure.

In the above step S101, the system of National Health Commission receives data to be converted from the hospital system. Specifically, the hospital system and the system of National Health Commission may transmit the data to be converted in the form of a message, wherein the message may be a character string of a fixed format used to describe data content; and a data sender (e.g., the hospital system) may send the data in an agreed format, and a data receiver (e.g., the system of National Health Commission) may parse the data in the agreed format, so that the data to be converted can be transmitted.

In some embodiments, to achieve data transmission between the hospital system and the system of National Health Commission, a front-end processor may be used. Specifically, a server may be provided in a server room of the hospital, and the server is installed with a service for receiving data transmitted by the hospital system, and the hospital system submits the data to be converted to the front-end processor by means of an interface, and the front-end processor gathers the data to the system of National Health Commission by means of a dedicated line.

The above-mentioned data to be converted includes a plurality of ranges. For example, the data to be converted may include ranges of "full name", "gender", "place of origin", "medical cost" and so on. The ranges in the data to be converted may need range conversion. For example, a range of "gender" element needs range conversion, or does not need range conversion. For example, a range of "full name" element does not need range conversion. Thus, there is a need to determine whether each range in the data to be converted needs range conversion. If so, step S102 is executed. That is to say, the subsequent steps of matching, range conversion and the like are executed only for a range in the data to be converted that needs range conversion. If not, step S106 is executed. That is, the subsequent steps of matching, range conversion and the like do not need to be executed for a range in the data to be converted that does not need range conversion. This avoids an increase in the amount of computation due to executing the subsequent steps of matching, range conversion and the like also for a range that does not need range conversion. In other words, by determining whether each range in the data to be converted needs range conversion, a range that needs range conversion is differentiated from a range that does not need range conversion, and subsequently different steps are performed respectively therefor, thus reducing the amount of computation and increasing the operation speed.

In practical applications, it may be pre-agreed which ranges need range conversion and which ranges do not need range conversion, and after the data to be converted is received, whether each range needs range conversion may be determined according to the pre-agreement.

Specifically, in the embodiment of the disclosure, redundant information is added to the message corresponding to the data to be converted. In addition to providing a code of a range, the redundant information may also be added with a name description corresponding to the code, wherein the code and the name description are both for describing a specific datum. For example, a range of "gender" may be "male" and "female", and specific range description thereof is: 1 (code) corresponds to text description of male (name description); and 2 (code) corresponds to text description of female (name description).

In addition, the redundant information may also be added with a standard that the range follows to facilitate subsequent matching of the code and the name description of the range to be converted with a preset matching rule. For example, if the redundant information is added with a national standard as a standard that the range of "gender" follows, a matching rule corresponding to "gender" may be directly found in the national standard, thereby achieving easier matching, and improving a matching effect.

In the above step S102, the code and the name description of the range to be converted may be acquired from a message corresponding to the data to be converted, and the code and the name description of the range to be converted are matched with a preset matching rule, wherein a plurality of mapping rules may be preset in the preset matching rule; if the code and the name description of the range to be converted can satisfy a certain mapping rule in the preset matching rule, the matching is successful, and step S103 is executed; and if the matching fails, step S104 is executed.

In the above step S103, range conversion is performed on the range to be converted, according to a mapping rule satisfied by the range to be converted. For example, in the range to be converted, for the range of "gender", where "1" represents male and "2" represent female, and if "male" represents male and "female" represents female in a mapping rule corresponding to "gender" in the preset matching rule, then "1" in the range to be converted is converted to "male" and "2" is converted to "female", thus completing the range conversion, and then the converted range is stored in the database.

In the above step S104, the range to be converted that fails to matching is marked. An attribute for describing the accuracy of the range is set in the range to be converted, and the range to be converted may be marked by setting the attribute. For example, the attribute of the range to be converted that fails to match may be set to "temporary", and the attribute of a converted range can be set to "formal". In addition, other marking methods may also be used, which is not limited here.

In the embodiment of the disclosure, the code and the name description of the range to be converted are matched with the preset matching rule; if the matching is successful, range conversion is performed on the range to be converted, and the converted range is stored in the database; and if the matching fails, the range to be converted that fails to matching is marked, and the marked range to be converted is also stored in the database, thus ensuring that the data exchange process is not interrupted, and reducing the workload of alignment in the early-stage of data exchange.

In practical applications, the data exchange method provided in the embodiment of the disclosure, as shown in FIG. 1, may further include:

S106, storing directly a range that does not need to be converted in the database.

There may be a range that does not need to be converted in the data to be converted, such as the range with the name "full name", and the range that does not need to be converted is directly stored in the database, which can avoid performing the subsequent steps of matching, range conversion and the like for the range that does not need to be converted, thus reducing the amount of computation in data exchange, and increasing the operation speed.

Figure 2:
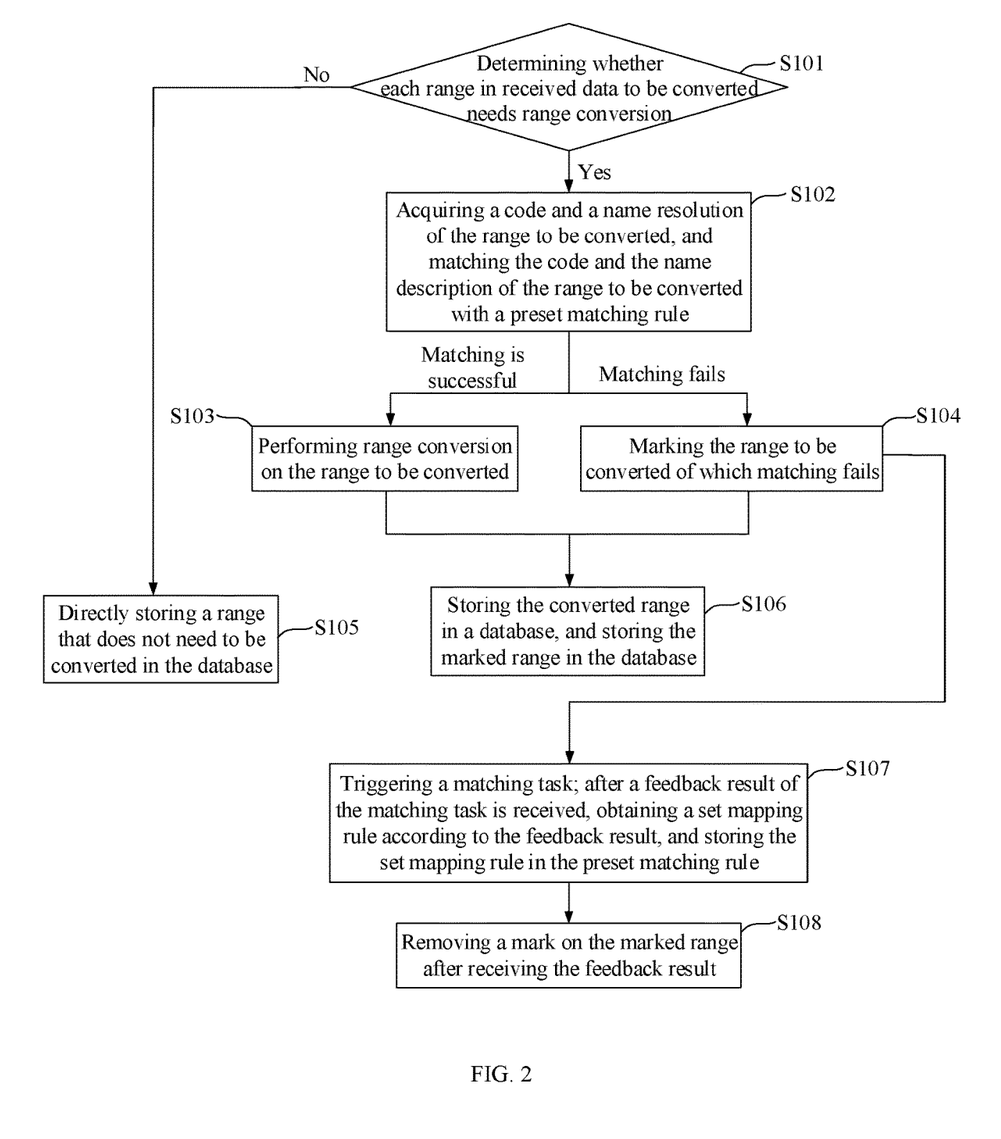
FIG. 2 illustrates a flow chart of a data exchange method in another embodiments of the disclosure.

Further, in the above-mentioned data exchange method provided in the embodiment of the disclosure, as shown in FIG. 2, if the matching between the code and the name description of the range to be converted and the preset matching rule fails, the method further includes:

S107, triggering a matching task, the matching task being used to provide a task processing interface and receive a feedback result of manual matching; and after the feedback result of the matching task is received, obtaining a set mapping rule according to the feedback result, and storing the set mapping rule in the preset matching rule.

In some embodiments, if the matching between the code and the name description of the range to be converted and the preset matching rule fails, a matching task may be triggered, thereby providing a relevant staff with a task processing interface, and in addition, a prompting message may also be sent to prompt the relevant staff to deal with it. The relevant staff may obtain information on the range to be converted that fails to match in the task processing interface, and a corresponding selection box or text box is provided in the task processing interface to perform manual matching by the relevant staff.

For example, in the preset matching rule, there is no mapping rule corresponding to "single", but there is a mapping rule corresponding to a close synonym of "single". For example, there is a mapping rule corresponding to "unmarried". The task processing interface may provide a corresponding selection box for the relevant staff to choose, and after the relevant staff chooses "unmarried" to correspond to "single", a mapping relationship between "single" and "unmarried" may be stored in the preset matching rule, and when the name description "single" appears again later, matching may be performed based on "unmarried".

As another example, there is no mapping rule related to "marital status" in the preset matching rule, and the range to be converted for "marital status" includes multiple data consisting of "Y" and "N". 37 The relevant staff learns, by referring to a material or by other means, that "Y" means "married" and "N" means "unmarried". Then in the task processing interface, "Y" may be associated with "married", and "N" may be associated with "unmarried" to perform manual matching of the range to be converted. In addition, a set mapping rule is obtained according to a feedback result of the matching task, and the set mapping rule is stored in the preset matching rule. For example, a mapping relationship between "Y" and "married", and between N" and "unmarried" is stored in the preset matching rule, and when the range of "marriage status" occurs later, the system can automatically perform the value conversion process.

In the embodiment of the disclosure, by triggering the matching task, the range that fails to match in the data exchange system can be matched manually, thus achieving a mechanism of real-time monitoring of the data exchange system by the relevant staff.

Still further, the above-mentioned data exchange method provided in the embodiment of the disclosure, as shown in FIG. 2, may further include:

S108, removing a mark on the marked range after receiving the feedback result.

In some embodiments, after the range to be converted that fails to match is marked, marked ranges may be counted by using a data processing record, and after the feedback result is received, the marked ranges may be found by using the data processing record, and correction is performed by using a manually matched range, and a mark on the range is removed.

Specifically, in the above-mentioned data conversion method provided in the embodiment of the disclosure, the above-mentioned step S102 may include:

searching, in the preset matching rule, for a rule consistent with a mapping relationship between the code and the name description of the range to be converted;

if so, determining that the matching is successful;

if not, searching in the preset matching rule, for a rule consistent with the mapping relationship of the name description of the range to be converted; if so, determining that the matching is successful; and if not, determining that the matching fails.

Using the range of "gender" as an example, in which "1" represents male and "2" represents female in the range to be converted, if there is a mapping rule corresponding to "gender" in the preset matching rule, and "1" represents male and "2" represents female in the mapping rule corresponding to "gender", then the matching is successful.

If there is no mapping relationship consistent with "1" representing male and "2" representing female in the preset matching rule, then it is determined whether there is a mapping relationship corresponding to "male" and "female" in the preset matching rule. For example, if there is a mapping relationship with "male" representing male and "female" representing female, the matching is successful, otherwise the matching fails.

Specifically, in the above-mentioned data conversion method provided in the embodiment of the disclosure, the above-mentioned step S102 may specifically include:

matching the code and the name description of the range to be converted in the order of a general standard mapping rule, a custom mapping rule, an attribute mapping rule, and a set mapping rule successively.

By setting a plurality of mapping rules in the preset matching rule, the probability of successful matching of the range to be converted may be higher, thus improving the automatic matching capability of the data exchange system. Specifically, priorities of the mapping rules may be set according to the actual situation. In step S102, the mapping rules may be matched with the range to be converted one by one in descending order of priorities, until a mapping relationship matched with the range to be converted is found, or after all the mapping rules fail to match the range to be converted, step S104 is executed.

Specifically, the above-mentioned general standard mapping rule may be a mapping rule of a national standard or industry standard; the above-mentioned custom mapping rule may be a mapping rule of a system-level standard or application-level standard; the above-mentioned attribute mapping rule may be a mapping relationship between a name description of a range and a synonym thereof; and the above-mentioned set mapping rule is a mapping rule obtained after a feedback result of manual matching.

In addition, the mapping rules in the preset matching rule may be set according to the actual situation, and the number, types and priorities of the mapping rules in the preset rule are not limited here. Moreover, the number of matching rules of each type may be set according to the actual situation. For example, 2 general standard mapping rules and 2 custom mapping rules may be set, and the number of mapping rules of each type is not limited here.

Further, the above-mentioned data exchange method provided in the embodiment of the disclosure may further include: providing a modification interface; and modifying the preset matching rule according to received rule modification information.

To facilitate subsequent modification of the mapping rules in the preset matching rule, a modification interface may also be provided. If the preset matching rule needs to be modified, the relevant staff may input modification information through the modification interface, and after the data exchange system receives the rule modification information, the preset matching rule may be modified according to the rule modification information to improve the flexibility of the data exchange system.

Based on the same inventive concept, an embodiment of the present invention further provides a data exchange apparatus. The problem-solving principle of the apparatus is similar to that of the above-mentioned method, and thus for the implementation of the apparatus, reference may be made to the implementation of the above-mentioned method, and repeated description is omitted.

Figure 3:
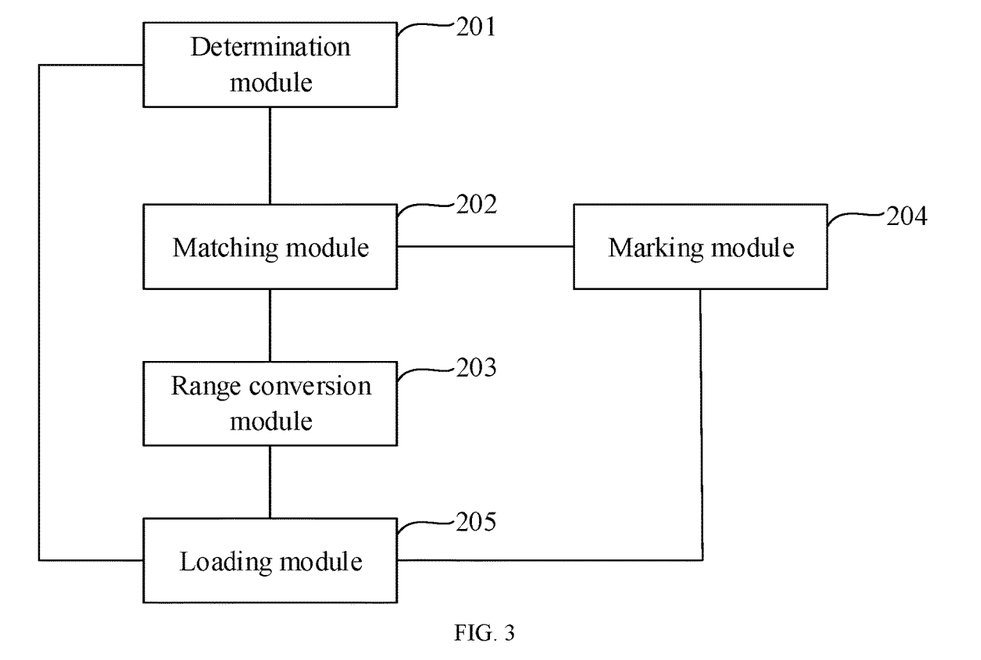
FIG. 3 illustrates a structural diagram of a data exchange apparatus in embodiments of the disclosure.

The data exchange apparatus provided in the embodiment of the disclosure, as shown in FIG. 3, includes:
  a determination module 201 configured to determine whether each range in received data to be converted needs range conversion;
  a matching module 202 configured to, if there is a range to be converted that needs to be converted in the data to be converted, acquire a code and a name description of the range to be converted, and match the code and the name description of the range to be converted with a preset matching rule;
  a range conversion module 203 configured to, if the matching between the code and the name description of the range to be converted and the preset matching rule is successful, perform range conversion on the range to be converted;
  a marking module 204 configured to, if the matching between the code and the name description of the range to be converted and the preset matching rule fails, mark the range to be converted that fails to match; and
  a loading module 205 configured to store the converted range in a database, and store the marked range in the database; and store each range in the data to be converted in the database, to complete a data exchange process.

Figure 4:
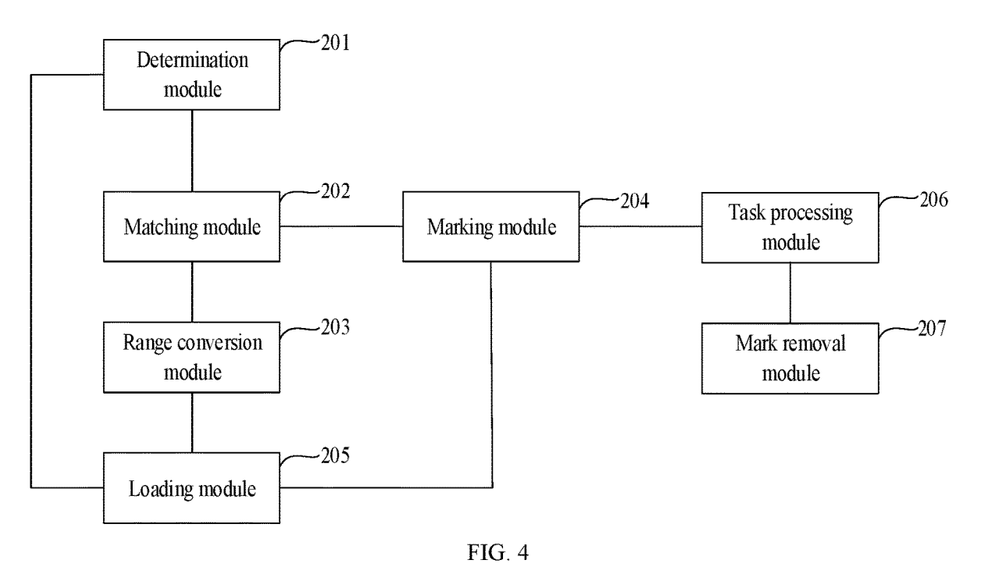
FIG. 4 illustrates a structural diagram of a data exchange apparatus in another embodiments of the disclosure.

In some embodiments, the above-mentioned data exchange apparatus provided in the embodiment of the disclosure, as shown in FIG. 4, may further include:
  a task processing module 206 configured to trigger a matching task if the matching between the code and the name description of the range to be converted and the preset matching rule fails, the matching task being used to provide a task processing interface and receive a feedback result of manual matching; and after the feedback result of the matching task is received, obtain a set mapping rule according to the feedback result, and store the set mapping rule in the preset matching rule.

The above-mentioned data exchange apparatus provided in the embodiment of the disclosure, as shown in FIG. 4, may further include:
  a mark removal module 207 configured to remove a mark on the marked range after receiving the feedback result.

Specifically, in the above-mentioned data exchange apparatus provided in the embodiment of the disclosure, the matching module is specifically configured to search in the preset matching rule, for a rule consistent with a mapping relationship between the code and the name description of the range to be converted; if so, determine that the matching is successful; and if not, search in the preset matching rule, for a rule consistent with the mapping relationship of the name description of the range to be converted; if so, determine that the matching is successful; and if not, determine that the matching fails.

Specifically, in the above-mentioned data exchange apparatus provided in the embodiment of the disclosure, the matching module may specifically be configured to:
  match the code and the name description of the range to be converted in the order of a general standard mapping rule, a custom mapping rule, an attribute mapping rule, and a set mapping rule successively.

In some embodiments, in the above-mentioned data exchange apparatus provided in the embodiment of the disclosure, as shown in FIG. 1, the loading module 205 is further configured to, if there is a range that does not need to be converted in the data to be converted, directly store the range that does not need to be converted in the database.

In some embodiments, the above-mentioned data exchange apparatus provided in the embodiment of the disclosure may further include a rule modification module configured to provide a modification interface; and modify the preset matching rule according to received rule modification information.

Based on the same inventive concept, an embodiment of the disclosure further provides a readable storage medium, which is configured to execute the above-mentioned data exchange method.

In some embodiments, the readable storage medium may include: a universal serial bus (USB) flash disk, a mobile hard disk, a read only memory (ROM), a random access memory (RAM), a magnetic disk or optical disk, or any of other various storage media that can store program codes.

Based on the same inventive concept, an embodiment of the disclosure further provides a data exchange system, including:
  a memory configured to store program instructions; and
  a processor configured to call the program instructions stored in the memory, and perform the following operations according to an obtained program: determining whether each range in received data to be converted needs range conversion; if so, acquiring a code and a name description of the range to be converted, and matching the code and the name description of the range to be converted with a preset matching rule; if the matching is successful, performing range conversion on the range to be converted; if the matching fails, marking the range to be converted that fails to match; and storing the range after range conversion in a database, and storing the marked range to be converted in the database; and storing each range in the data to be converted in the database, thus completing a data exchange process.

In the embodiments of the present invention, it should be understood that the disclosed apparatus and method may be implemented in other ways. For example, the apparatus embodiments described above are merely illustrative. For example, the modules or the division of the modules is only a logical function division, and there may be other division manners in actual implementations. For example, multiple modules or components may be combined or may be integrated into another system, or some features may be ignored or not executed. In addition, the mutual coupling or direct coupling or communicative connection as shown or discussed may be achieved by some interfaces, and the indirect coupling or communicative connection between devices or units may be in an electrical, mechanical or other form.

The functional modules in the embodiments of the disclosure may be integrated in a single processing unit, or each module may be a separate physical module. The integrated modules may be stored in a readable storage medium if implemented in the form of a software functional unit and sold or used as a separate product. Based on such understanding, all or part of the technical solutions of embodiments of the present invention may be embodied in the form of a software product, and the computer software product is stored in a storage medium, and includes a number of instructions configured to cause a computer device, which may be a personal computer, a server, or a network device, for example, or a processor to execute all or part of the steps of the method described in the embodiments of the present invention.

Those skilled in the art shall appreciate that the embodiments of the application may be provided as a method, an apparatus or a computer program product. Therefore, the present invention may be embodied in the form of an all-hardware embodiment, an all-software embodiment or an embodiment of software and hardware in combination. Furthermore, the disclosure may be embodied in the form of a computer program product embodied in one or more computer useable storage mediums (including but not limited to a disk memory, a CD-ROM, and an optical memory) in which computer useable program codes are contained.

The disclosure is described in a flow chart and/or a block diagram of the method, the apparatus and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions may be loaded onto a general-purpose computer, a specific-purpose computer, an embedded processor or a processor of another programmable data processing device so that the instructions executed on the computer or the processor of the other programmable data processing device can implement the functions specified in the flow(s) of the flow chart and/or the block(s) of the block diagram.

These computer program instructions may also be stored into a computer readable memory capable of directing the computer or the other programmable data processing device to operate in a specific manner so that the instructions stored in the computer readable memory create an article of manufacture including instruction means which performs the functions specified in the flow(s) of the flow chart and/or the block(s) of the block diagram.

These computer program instructions may also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

In the data exchange method and apparatus, the readable storage medium, and the data exchange system provided in the embodiments of the disclosure, by matching the code and the name description of the range to be converted with the preset matching rule, the workload of alignment in an early-stage of data exchange is reduced, and as the range to be converted that fails to match is marked and then stored in the database, and manual matching may be performed by triggering the matching task, the problem of interruption in the data exchange process is avoided, the online difficulty of the data exchange system is effectively reduced, data loading timeliness is ensured in the data exchange process, and the coupling of the data exchange system is improved.

Evidently those skilled in the art can make various modifications and variations to the disclosure without departing from the spirit and scope of the disclosure. Thus, the disclosure is also intended to encompass these modifications and variations thereto so long as the modifications and variations come into the scope of the claims appended to the disclosure and their equivalents.

What is claimed is:

1. A data exchange method, comprising:
   determining whether each range in received data to be converted needs range conversion;
   in response to determining a range needs range conversion, acquiring a code and a name description of the range to be converted, and matching the code and the name description of the range to be converted with a preset matching rule;
   in response to a successful matching, performing range conversion on the range to be converted;
   in response to a failed matching, marking the range to be converted of which matching fails; and
   storing a converted range in a database, and storing a marked range in the database; and storing remaining ranges in the data to be converted in the database, to complete a data exchange process;
   wherein said matching the code and the name description of the range to be converted with the preset matching rule comprises:
   searching in the preset matching rule, for a rule consistent with a mapping relationship between the code and the name description of the range to be converted;
   in response to finding the rule consistent with the mapping relationship between the code and the name description of the range to be converted, determining that the matching is successful; and
   in response to that no rule consistent with the mapping relationship between the code and the name description of the range to be converted is found, searching in the preset matching rule, for a rule consistent with the mapping relationship of the name description of the range to be converted;
in response to finding the rule consistent with the mapping relationship of the name description of the range to be converted, determining that the matching is successful; and
in response to that no rule consistent with the mapping relationship of the name description of the range to be converted is found, determining that the matching fails.

2. The method of claim 1, wherein in response to the failed matching, the method further comprises:
triggering a matching task, the matching task being used to provide a task processing interface and receive a feedback result of manual matching; and
after the feedback result of the matching task is received, obtaining a set mapping rule according to the feedback result of the matching task, and storing the set mapping rule in the preset matching rule.

3. The method of claim 2, further comprising: removing a mark on the marked range after receiving the feedback result of the matching task.

4. The method of claim 1, wherein said matching the code and the name description of the range to be converted with the preset matching rule comprises:
matching the code and the name description of the range to be converted in an order of a general standard mapping rule, a custom mapping rule, an attribute mapping rule, and a set mapping rule successively.

5. The method of claim 1, further comprising:
if there is a range that does not need to be converted in the data to be converted, directly storing the range that does not need to be converted in the database.

6. The method of claim 1, further comprising:
providing a modification interface; and
modifying the preset matching rule according to received rule modification information.

7. A non-transitory readable storage medium, which is configured to execute a data exchange method of:
determining whether each range in received data to be converted needs range conversion;
in response to determining a range needs range conversion, acquiring a code and a name description of the range to be converted, and matching the code and the name description of the range to be converted with a preset matching rule;
in response to a successful matching, performing range conversion on the range to be converted;
in response to a failed matching, marking the range to be converted of which matching fails; and
storing a converted range in a database, and storing a marked range in the database; and
storing remaining ranges in the data to be converted in the database, to complete a data exchange process;
wherein said matching the code and the name description of the range to be converted with the preset matching rule comprises:
searching in the preset matching rule, for a rule consistent with a mapping relationship between the code and the name description of the range to be converted;
in response to finding the rule consistent with the mapping relationship between the code and the name description of the range to be converted, determining that the matching is successful; and
in response to that no rule consistent with the mapping relationship between the code and the name description of the range to be converted is found, searching in the preset matching rule, for a rule consistent with the mapping relationship of the name description of the range to be converted;
in response to finding the rule consistent with the mapping relationship of the name description of the range to be converted, determining that the matching is successful; and
in response to that no rule consistent with the mapping relationship of the name description of the range to be converted is found, determining that the matching fails.

8. The non-transitory readable storage medium of claim 7, wherein in response to the failed matching, the method further comprises:
triggering a matching task, the matching task being used to provide a task processing interface and receive a feedback result of manual matching; and
after the feedback result of the matching task is received, obtaining a set mapping rule according to the feedback result of the matching task, and storing the set mapping rule in the preset matching rule.

9. The non-transitory readable storage medium of claim 8, wherein the method further comprises: removing a mark on the marked range after receiving the feedback result of the matching task.

10. The non-transitory readable storage medium of claim 7, wherein said matching the code and the name description of the range to be converted with the preset matching rule comprises:
matching the code and the name description of the range to be converted in an order of a general standard mapping rule, a custom mapping rule, an attribute mapping rule, and a set mapping rule successively.

11. The non-transitory readable storage medium of claim 7, wherein the method further comprises:
if there is a range that does not need to be converted in the data to be converted, directly storing the range that does not need to be converted in the database.

12. The non-transitory readable storage medium of claim 7, wherein the method further comprises:
providing a modification interface; and
modifying the preset matching rule according to received rule modification information.

13. A data exchange system, comprising:
a memory configured to store program instructions; and
a processor configured to call the program instructions stored in the memory, and perform following operations according to the program instructions:
determining whether each range in received data to be converted needs range conversion;
in response to determining a range needs range conversion, acquiring a code and a name description of the range to be converted, and matching the code and the name description of the range to be converted with a preset matching rule;
in response to a successful matching, performing range conversion on the range to be converted;
in response to a failed matching, marking the range to be converted of which matching fails; and
storing a converted range in a database, and storing a marked range in the database; and
storing remaining ranges in the data to be converted in the database, to complete a data exchange process;
wherein the processor is configured to perform matching the code and the name description of the range to be converted with the preset matching rule by:

searching in the preset matching rule, for a rule consistent with a mapping relationship between the code and the name description of the range to be converted;

in response to finding the rule consistent with the mapping relationship between the code and the name description of the range to be converted, determining that the matching is successful; and in response to that no rule consistent with the mapping relationship between the code and the name description of the range to be converted is found, searching in the preset matching rule, for a rule consistent with the mapping relationship of the name description of the range to be converted;

in response to finding the rule consistent with the mapping relationship of the name description of the range to be converted, determining that the matching is successful; and in response to that no rule consistent with the mapping relationship of the name description of the range to be converted is found, determining that the matching fails.

14. The data exchange system of claim 13, wherein in response to the failed matching, the processor is further configured to perform:

triggering a matching task, the matching task being used to provide a task processing interface and receive a feedback result of manual matching; and after the feedback result of the matching task is received, obtaining a set mapping rule according to the feedback result of the matching task, and storing the set mapping rule in the preset matching rule.

15. The data exchange system of claim 14, wherein the processor is further configured to perform: removing a mark on the marked range after receiving the feedback result of the matching task.

16. The data exchange system of claim 13, wherein the processor is configured to perform matching the code and the name description of the range to be converted with the preset matching rule by:

matching the code and the name description of the range to be converted in an order of a general standard mapping rule, a custom mapping rule, an attribute mapping rule, and a set mapping rule successively.

17. The data exchange system of claim 13, wherein the processor is further configured to perform:

if there is a range that does not need to be converted in the data to be converted, directly storing the range that does not need to be converted in the database.

18. The data exchange system of claim 13, wherein the processor is further configured to perform:

providing a modification interface; and modifying the preset matching rule according to received rule modification information.

* * * * *

UNITED STATES PATENT AND TRADEMARK OFFICE
CERTIFICATE OF CORRECTION

| | | |
|---|---|---|
| PATENT NO. | : 12,056,146 B2 | |
| APPLICATION NO. | : 17/418224 | |
| DATED | : August 6, 2024 | |
| INVENTOR(S) | : Yingkai Xie | |

It is certified that error appears in the above-identified patent and that said Letters Patent is hereby corrected as shown below:

On the Title Page

Item (86) should read:
§ 371(c)(1),(2) Date: Jun. 24, 2021

Signed and Sealed this
Twenty-fourth Day of September, 2024

Katherine Kelly Vidal
*Director of the United States Patent and Trademark Office*